Patented Aug. 14, 1945

2,382,915

UNITED STATES PATENT OFFICE 2,382,915

MANUFACTURE OF SUBSTITUTED PYRROLES

Maurice Arthur Thorold Rogers, Blackley, Manchester, England, assignor to Imperial Chemical Industries Limited, a corporation of Great Britain No Drawing. Application September 3, 1942, Serial No. 457,229. In Great Britain December 17, 1941

6 Claims. (Cl. 260—313)

The invention relates to the manufacture of new compounds, namely, 2:4-diarylpyrroles.

It is known that pyrrolines and pyrrolidines are dehydrogenated by suitable heat treatment in the presence of precious metal catalysts.

According to the present invention I provide a process for the manufacture of 2:4-diarylpyrroles which comprises bringing a 2:4-diarylpyrroline or a 2:4-diarylpyrrolidine into contact, in the liquid phase, with a dehydrogenation agent at a suitable temperature for dehydrogenation.

The new 2:4-diarylpyrroles have the formula

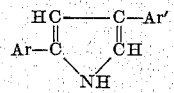

wherein Ar and Ar' each stand for aryl radicals, for example of the benzene or naphthalene series, the same or different, substituted or not.

The starting-out materials, namely, the 2:4-diarylpyrrolines and -pyrrolidines, are obtainable by reduction of compounds of the general formula

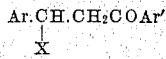

wherein Ar and Ar' stand for aryl radicals and X stands for the group $CH_2-NO_2$ or the group CN. Thus 2:4-diphenylpyrroline may be made by reduction of 1-nitro-2:4-diphenylbutanone-4 by means of zinc dust or iron filings and acetic acid (Sonn, Berichte der deutschen Chemischen Gesellschaft, 1935, vol. 68, page 148) or by reduction of 1-phenyl-2-benzoyl-propionitrile by means of hydrogen in presence of a nickel catalyst (Rupe and Gisiger, Helvetica Chimica Acta, 1925, vol. 8, page 338).

As examples of starting-out materials there may be mentioned 2:4-diphenylpyrroline, 2-(p-methoxyphenyl)-4-phenylpyrroline, 2-phenyl-4-(p-methoxyphenyl)-pyrroline, 2-(m-hydroxyphenyl)-4-phenylpyrroline, 2-(o-chlorophenyl)-4-phenylpyrroline, 2-(p-acetylaminophenyl)-4-phenylpyrroline, 2-α-naphthyl-4-phenylpyrroline, 2-phenyl-4-β-naphthylpyrroline, or the corresponding pyrrolidines.

As suitable dehydrogenation agents, there may be mentioned selenium, "Raney" nickel (see U. S. P. 1,628,190), molybdenum sulphide, copper chromite, copper powder, zinc dust, and sulphur. These do not necessarily all behave in the same way in effecting the dehydrogenation. Some, as for example "Raney" nickel act catalytically, that is to say the agent is recoverable unchanged at the end of the process. Others may not act catalytically, for example with sulphur the dehydrogenation of the pyrroline or pyrrolidine may be brought about in such a way that the hydrogen combines with the sulphur to give hydrogen sulphide. In this connection it is noteworthy that, contrary to what might be supposed from the known behaviour of selenium in dehydrogenating other compounds, we have found that in the process of the present invention it acts catalytically, that is to say, the dehydrogenation which takes place in presence of selenium does not involve the formation of hydrogen selenide, or at least, the greater part of the selenium has acted catalytically in the sense that it is recoverable unchanged at the end of the process.

As a convenient temperature at which to carry out the dehydrogenation process the range of from 250° to 360° C. has been found suitable. To obviate any action of the oxygen of the air, the process may be carried out in an inert atmosphere, for example, in an atmosphere of nitrogen. After the completion of the dehydrogenation process the reaction mixture is cooled and separated from the dehydrogenation agent, as by solution in a suitable liquid, for example benzene or chloroform, followed by filtration. The pyrrole may be recovered from the filtered solution by, for example, evaporation, and may thereafter be purified by conventional methods.

The new compounds are useful as intermediates.

The following examples, in which the parts are by weight, illustrate but do not limit the invention:

Example 1

5 parts of 2:4-diphenylpyrroline are mixed with 5 parts of powdered selenium in a vessel adapted for the passage of a current of nitrogen. Nitrogen is passed through the vessel and the contents are heated to 250° C. for 3 hours. The reaction mixture is then cooled and 25 parts of hot benzene are added. This mixture is filtered. The 2:4-diphenylpyrrole separates from the benzene on cooling in long, colourless needles, M. P. 179–180° C.

Example 2

10 parts of 2:4-diphenylpyrroline are heated in a vessel fitted for the passage of nitrogen, with one part of "Raney" nickel. Nitrogen is passed through the vessel and the contents are heated at 360° C. for 6 hours. The mixture is then cooled and 60 parts of hot chloroform are added. The solution is then filtered to remove nickel and the filtrate is concentrated by distillation until 30 parts of chloroform have distilled. The residual solution when cooled deposits crystals of 2:4-diphenylpyrrole.

I claim:

1. 2:4-diarylpyrroles of the formula

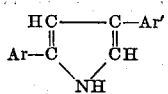

wherein Ar and Ar' stand for aryl radicals of the benzene series.

2. 2:4-diphenylpyrrole, the same being a crystalline solid, melting at about 180° C.

3. Process as claimed in claim 6 wherein the dehydrogenation is carried out in an inert atmosphere.

4. A process of preparing 2:4-diphenylpyrrole, which comprises heating 2:4-diphenylpyrroline in the liquid phase, in an inert atmosphere and in contact with selenium at a temperature of about 250° C., and recovering the reaction product.

5. A process of preparing 2:4-diphenylpyrrole, which comprises heating 2:4-diphenylpyrroline in the liquid phase, in an inert atmosphere and in contact with a nickel dehydrogenation catalyst, at a temperature of about 360° C., and recovering the reaction product.

6. A process for the manufacture of 2:4-diaryl-pyrroles having the formula

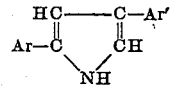

wherein Ar and Ar' stand for aryl radicals of the benzene series, which comprises bringing a member of the group consisting of the corresponding 2:4-diaryl-pyrrolines and 2:4-diaryl-pyrrolidines into contact, in the liquid phase, with a dehydrogenation agent, at a temperature within the range of 250° to 360° C.

MAURICE ARTHUR THOROLD ROGERS.

CERTIFICATE OF CORRECTION.

Patent No. 2,382,915. August 14, 1945.

MAURICE ARTHUR THOROLD ROGERS.

It is hereby certified that error appears in the printed specification of the above numbered patent requiring correction as follows: Page 1, first column, line 40, for "(p-methoxylphenyl)-pyrroline" read --(p-methoxyphenyl)-pyrroline--; and that the said Letters Patent should be read with this correction therein that the same may conform to the record of the case in the Patent Office.

Signed and sealed this 13th day of November, A. D. 1945.

(Seal)

Leslie Frazer
First Assistant Commissioner of Patents.